(12) United States Patent
Pandolph et al.

(10) Patent No.: US 6,450,331 B2
(45) Date of Patent: *Sep. 17, 2002

(54) COMPACT DISC CARRYING CASE

(75) Inventors: Patrick Anthony Pandolph, Blairsville, GA (US); James E. Seigel, Lake Placid, FL (US)

(73) Assignee: 2BNGenius Inc., Blairsville, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/681,810

(22) Filed: Jun. 8, 2001

Related U.S. Application Data (63) Continuation of application No. 09/512,182, filed on Feb. 24, 2000, now Pat. No. 6,283,281.

(51) Int. Cl.[7] .............................................. B65D 85/57
(52) U.S. Cl. .................... 206/308.1; 206/310; 312/9.16
(58) Field of Search ............................. 206/307, 308.1, 206/309–312, 493; 312/9.11, 9.16, 9.47, 9.48

(56) References Cited

U.S. PATENT DOCUMENTS

| | | | | |
|---|---|---|---|---|
| 4,453,785 A | * | 6/1984 | Smith ......................... | 206/307 |
| 5,265,721 A | * | 11/1993 | Castritis ...................... | 206/309 |
| 5,360,106 A | * | 11/1994 | Nakayama et al. .......... | 206/309 |
| 5,590,768 A | * | 1/1997 | Hilton et al. ............. | 206/308.1 |
| 5,706,943 A | * | 1/1998 | Yu ........................... | 206/308.1 |

* cited by examiner

*Primary Examiner*—Luan K. Bui
(74) *Attorney, Agent, or Firm*—Hovey Williams LLP (57) ABSTRACT

The disc carrying case includes a housing defining a chamber in which the disc is stored. An elongated slot provides access to the chamber, such that the disc moves edgewise through the slot when it is transferred into and out of the chamber. A pair of tracks aligned with the slot serve to support the disc within the chamber by only the outer rim thereof. Furthermore, a spring biased catch located within the chamber automatically projects into the mounting hole of the disc, when the disc has been sufficiently inserted into the chamber, to prevent relative edgewise movement of the disc. While the disc is held by the catch, an ejector engages the outer edge of the disc and exerts a yieldable ejection bias thereagainst. Removal of the catch from the mounting hole is caused by actuation of a release mechanism. Such removal of the catch permits the ejector to urge the disc out of the chamber.

35 Claims, 4 Drawing Sheets

COMPACT DISC CARRYING CASE

CROSS REFERENCE TO RELATED APPLICATIONS

This is a continuation of application Ser. No. 09/512,182 filed Feb. 24, 2000, now U.S. Pat. No. 6,283,281, which is hereby incorporated by reference herein.

BACKGROUND OF INVENTION

1. Field of the Invention

The present invention relates generally to a case for carrying a disc (e.g, an optical disc). More particularly, the present invention concerns a disc carrying case that reduces handling of the disc and minimizes the risk of damage to the disk as it moved between storage and the drive.

2. Discussion of Prior Art

With particular respect to optical discs (e.g., compact discs, mini-discs, etc.), there is often difficulty in safely transferring the disk between a traditional storage case (sometimes referred to as a "jewel case") and the drive on which the disc is used. This problem is at least partly attributable to the fact that it is undesirable to touch at least one of the opposite circular disc faces on which information might be stored. When the disc is handled, the user must consequently insert a finger into the central mounting hole of the disc, if possible, or alternatively hold the disc by the thin outer edge. Thus, the disc is naturally unwieldy. Moreover, it is extremely important that the disc faces not be scratched or otherwise damaged; otherwise, the drive will unlikely be able to read the information stored thereon.

It is believed that standard disc cases only complicate the matter by making handling of the disc even more tedious and difficult as the disc is transferred between the case and the drive. Particularly, a standard disc case includes hingedly connected upper and lower covers that swing apart from one another when the case is opened. Not only does such a construction require two-handed operation, but it is often difficult to initially pry the covers apart so that the case may be opened. Further, the lower cover will normally have a plastic post formed by a plurality of circumferentially spaced flexible tabs that cooperatively engage the disc within its central opening to support the disc above the inside face of the lower cover. Unless the disc is precisely centered over the post, the post will contact the bottom face of the disc (typically the face containing the information pits) and may consequently create a scratch thereon.

OBJECTS AND SUMMARY OF THE INVENTION

Responsive to these and other problems, an important object of the present invention is to facilitate handling and reduce the risk of damage to the disc as it is transferred between storage and the drive. It is particularly an important object of the present invention to provide a disc carrying case that minimizes and simplifies handling of the disc as it is transferred between the case and the drive. In addition, an important object of the present invention to provide a disc case that essentially ensures safe transfer of the disc to and from the case. Another important object of the present invention is to provide a disc case that requires essentially one-handed operation when the disc is transferred to and from the case. Yet another important object of the present invention is to provide a disc case that meets the above-noted objectives yet has a simple, durable and inexpensive construction.

In accordance with these and other objects evident from the following description of the preferred embodiment, the present invention concerns a disc carrying case including a housing presenting a disc chamber configured to receive a disc therein. A chamber access opening, which can be in the form of an elongated slot, is defined in the housing so that the disc moves through the opening (in an edgewise fashion when the housing has the slotted access opening) as it is transferred into and out of the chamber. A catch located in the chamber is removably insertable within the mounting hole of the disc to prevent relative shifting of the disc. In one form of the invention, the catch is shiftable into and out of the mounting hole. Most preferably, the catch is spring biased into the mounting hole to automatically catch the disc when it has been sufficiently inserted into the housing. A disc ejector provides a yieldable ejection bias that is sufficient to eject the disc out of the chamber, however, a release prevents the ejector from causing the disc to be ejected until the release has been actuated. The invention contemplates having the ejector provide a bias against the disc while it is held by the catch and coupling the release to the catch to control shifting of the catch into and out of the mounting hole of the disc. Accordingly, the ejector is permitted to eject the disc as soon as the release is actuated to shift the catch out of the mounting hole.

Other aspects and advantages of the present invention will be apparent from the following detailed description of the preferred embodiments and the accompanying drawing figures.

BRIEF DESCRIPTION OF DRAWINGS

Preferred embodiments of the invention are described in detail below with reference to the attached drawing figures, wherein.

DETAILED DESCRIPTION OF THE PREFERRED EMBODIMENTS

Figures 1, 9:
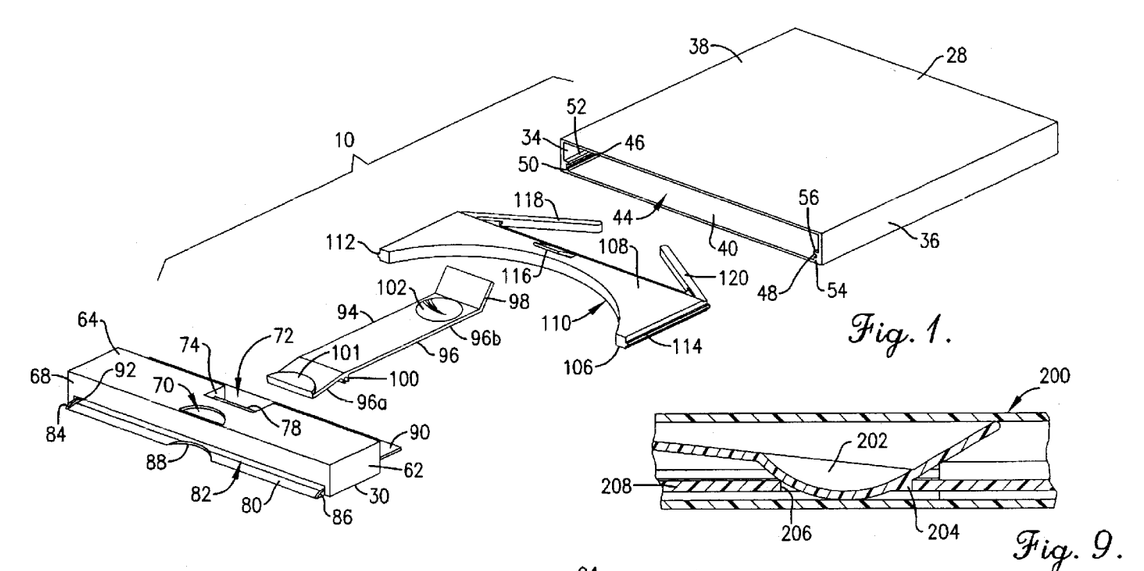
FIG. 1 is an exploded perspective view of a compact disc carrying case constructed in accordance with the principles of the present invention.
FIG. 9 is a relatively enlarged, fragmentary, cross-sectional view of an alternative embodiment, wherein the disc catch of the case is provided with a ridge configured to be matingly received within the adjacent section of the mounting hole.

Turning initially to FIG. 1, the disc carrying case 10 selected for illustration is designed to store a single disc 12

(see FIGS. 4–8). The disc 12 is an optical disc commonly referred to as a compact disc. More particularly, the disc 12 is circular in shape to present an outer circular edge 14 and has opposite top and bottom faces 16 and 18. Traditionally, the bottom face 18 is provided with a pattern of pits (not shown) that serve to encode information on the disc 12. A metallic layer (not shown) is also traditionally provided on the bottom face 18 to enhance the reflectivity of the pits so as to improve the readability of the information by a laser disc drive (not shown). The pits and metallic layer are spaced inwardly from the outer edge 14 so that an informationless outer rim 20 extends around the perimeter of the disc 12. It is also noted that the top face 16 is normally not encoded with information, although the principles of the present invention are equally applicable to storing a so-called "double-sided" disc in the case 10, wherein information is stored on both the top and bottom faces 16 and 18. The compact disc 12 further includes a circular interior edge 22 that defines a central mounting hole 24. The mounting hole 24 is received on a post (not shown) within the disc drive when the drive is used to read the disc 12.

It is entirely within the ambit of the present invention, however, to configure the case 12 for storing various other types of discs or disc-like information media devices. For example, the inventive case is particularly well suited for use with various other types of optical discs (e.g., a mini-disc). As will also be apparent from the following description, the present invention is particularly adapted for use with rigid, relatively thin, circular discs, although the scope and spirit of the invention should not be limited to such applications. Furthermore, the principles of the present invention are equally applicable to a case designed to hold multiple discs, or a plurality of cases that are stackable or otherwise connectable to one another to provide a multiple disc storage rack.

Figure 3:
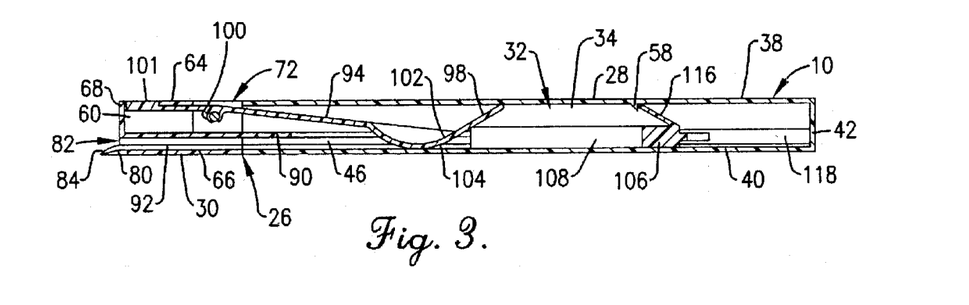
FIG. 3 is a cross-sectional view taken along line 3—3 of FIG. 2.
Figure 4:
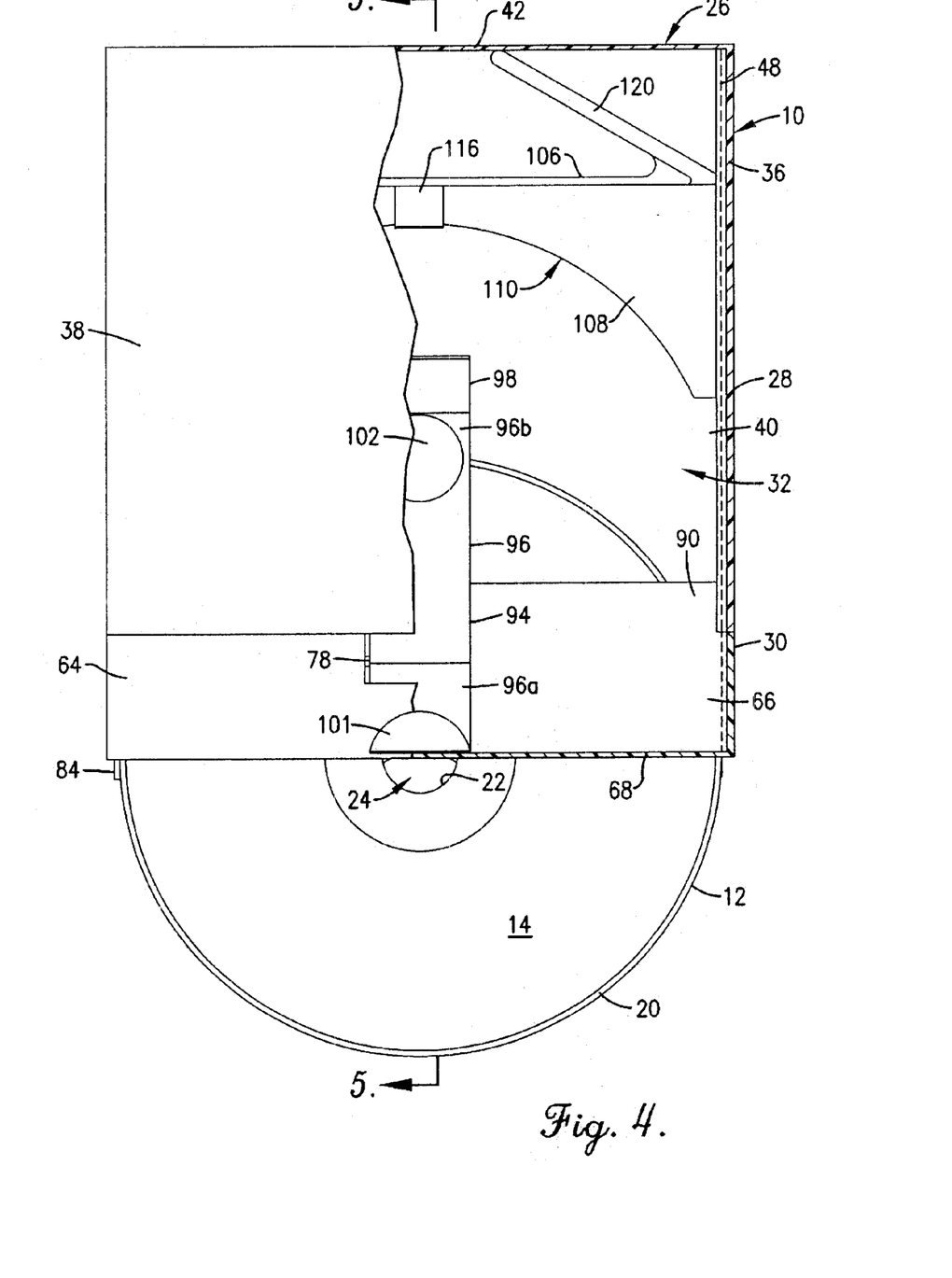
FIG. 4 is a plan view of the case with parts being sectioned away to particularly illustrate the case as a disc is inserted into the housing and causes shifting of the catch out of the retaining position.
Figure 5:
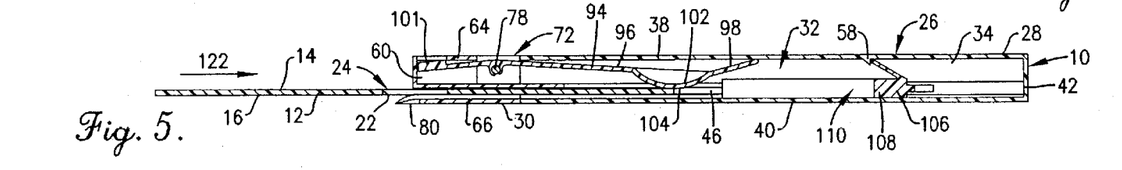
FIG. 5 is a cross-sectional view taken along line 5—5 of FIG. 4.
Figure 6:
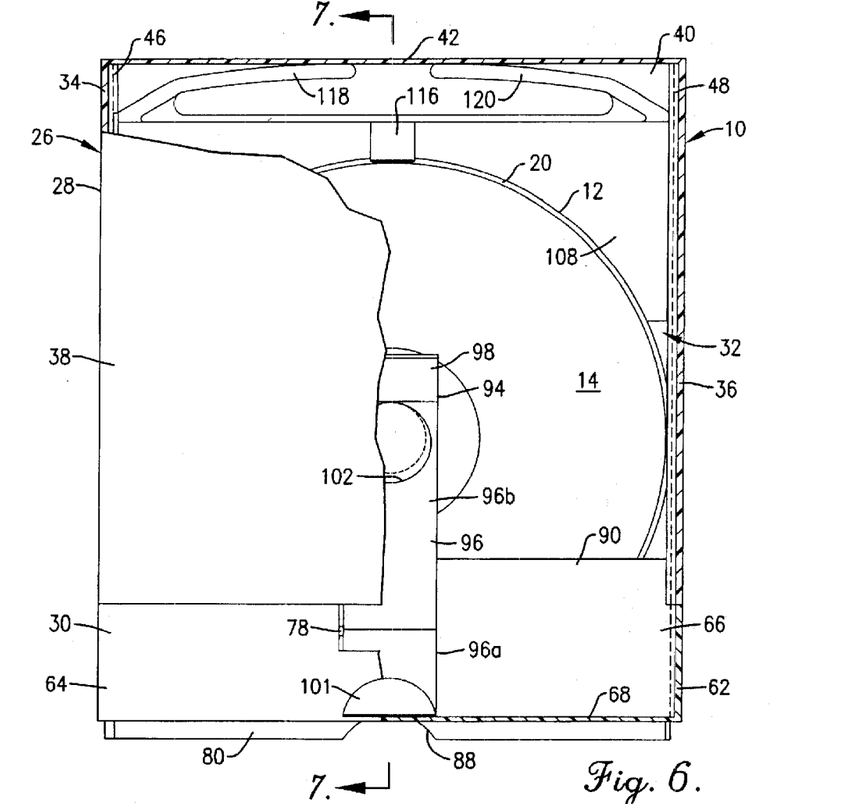
FIG. 6 is plan view of the case with parts being sectioned away to particularly illustrate a disc being retained within the housing.

With the foregoing caveats in mind, the illustrated case 10 includes a housing 26 in which the disc 12 is stored. The housing 26 generally includes an open-ended, boxlike jacket 28 and a cap 30 that cooperates with the jacket 28 to form a disc chamber 32 (e.g., see FIGS. 1 and 3). Again, the illustrated chamber 32 is designed to receive only the single disc 12 therein (e.g., see FIGS. 6 and 7), although it is entirely within the spirit of the present invention to provide a multiple disc-receiving chamber if desired.

As perhaps best shown in FIG. 1, the jacket 28 includes a pair of spaced side walls 34 and 36, a top wall 38 and bottom wall 40 each extending between the sidewalls 34 and 36, and an end wall 42 closing off the far end of the jacket 28. Each of the walls 34,36,38,40,42 is rectangular in shape. Further, the front margins of the side walls 34 and 36 and top and bottom walls 38 and 40 cooperatively define an open end 44 of the jacket 28.

Figure 2:
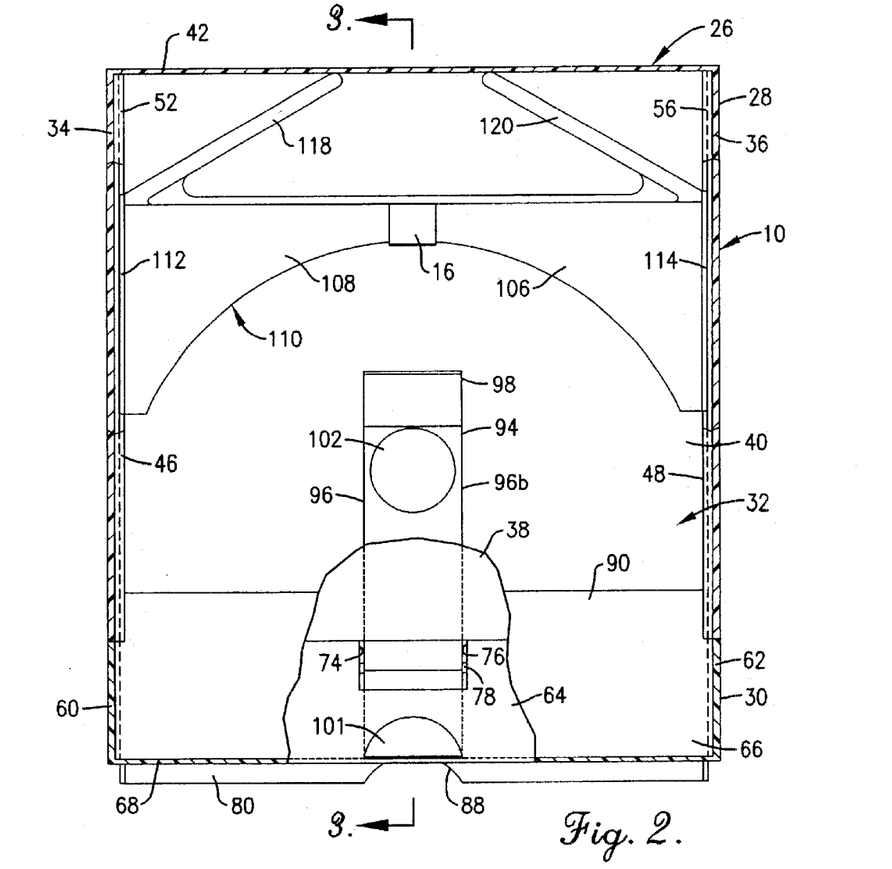
FIG. 2 is a plan view of the case with parts being sectioned away to particularly illustrate constructional details of the housing and the ejector in the position closest to the chamber access opening.

A pair of tracks 46 and 48 are defined along the inside surfaces of the walls 34 and 36, respectively. In the preferred embodiment, the track 46 is formed by a first rib 50 and an upwardly spaced second rib 52. The first rib 50 is preferably defined along the inside juncture of the side wall 34 and bottom wall 40, while the upper rib 52 projects inwardly from the side wall 34. The preferred ribs 50 and 52 extend continuously from the open end 44 to the end wall 42 (e.g., see FIG. 2). The illustrated track 48 is similarly formed by a pair of vertically spaced ribs 54 and 56. The jacket 28 is configured so that the tracks 34 and 36 slidably receive the disc 12 when it is inserted into the housing 26 (e.g., see FIG. 5). In this regard, the disc 12 is supported above the bottom wall 40 so as to minimize contact between the disc 12 and jacket 28. Moreover, the jacket 28 is configured to correspond with the disc 12 stored therein, in the sense that only the outer rim 20 of the disc 12 is preferably received within the tracks 46 and 48 (e.g., see FIG. 6). Such an arrangement virtually ensures that potentially damaging contact between the jacket 28 and disc 12, while the latter is supported in the former, is avoided.

The principles of the present invention are equally applicable to various other track configurations and arrangements. For example, the tracks 46 and 48 need not be separated or noncontiguous, as with the illustrated embodiment, but rather a track may also be provided along the end wall of the jacket, if desired, such that there are a pair of ribs that extend completely around the inside of the jacket. It is also possible to alternatively form the tracks from two vertically spaced rows of spaced apart tabs so as to minimize contact between the disc and housing. Yet another feasible alternative involves removing the top rib of each track entirely so that only the lower rib is provided.

The jacket 28 further includes a triangular-shaped stop element 58 (e.g., see FIGS. 3, 5, and 7) projecting inwardly from the inside face of the top wall 38. The stop element 58 is located centrally between the side walls 34 and 36. Although the stop element 58 may be variously shaped and sized, it is preferred that the element 58 has an abutment face 58a facing the end wall 42 preferably at an angle perpendicular to the top wall 38 and a cam face 58b facing the open end 44 and sloping downwardly toward the abutment face 58a at an oblique angle with respect to the top wall 38.

The preferred jacket 28 is integrally formed of a plastic material, although other suitable materials and constructions are entirely within the ambit of the present invention. It is also possible to employ various other jacket sizes and shapes.

Generally speaking, the cap 30 serves to cover the open end 44 of the jacket 28. The illustrated cap 30 is generally hollow and includes a pair of spaced side walls 60 and 62, top and bottom walls 64 and 66 extending between the side walls 60 and 62, and an end wall 68 (e.g., see FIG. 1). The ends of the walls 60,62,64,66 opposite from the end wall 68 cooperatively define an open end (not referenced in the drawing figures) that is similar in size and shape to the open end 44 of the jacket 28.

The top wall 64 is provided with a button opening 70 that is centrally located immediately behind the end wall 68. A clearance recess 72 is also defined in the top wall 64 but projects inwardly from the opposite end thereof. A pair of interior walls 74 and 76 depend from the top wall 64 along opposite sides of the recess 72 (see also FIG. 2). For reasons which will subsequently be described, a pivot bar 78 is connected between the interior walls 74 and 76.

A tapered lip 80 projects outwardly from the end wall 68 along generally the same plane in which the bottom wall 66 lies. The lip 80 is slightly shorter than the end wall 68 and is consequently spaced inwardly from the side walls 60 and 62. Immediately above the lip 80 is a chamber access slot 82 defined in the end wall 68. The preferred slot 82 is relatively narrow and generally coextensive with the lip 80. Particularly, the slot 82 is slightly oversized relative to the thickness of the disk 12 (e.g., see FIG. 5), such that the disc 12 moves edgewise (i.e., along the plane in which the disc principally 12 lies) through the slot 82 as it is transferred to and from the chamber 32. A pair of end tabs 84 and 86 (see particularly FIG. 1) are provided at each end of the lip 80 to facilitate movement of the disc 12 through the slot 82 (i.e., the tabs 84 and 86 ensure that the disc 12 is laterally aligned with the slot 82 during movement therethrough). Finally, a semicircular finger cutout 88 defined at the center of the lip 80 facilitates removal of the disc 12 from the case 10 and complete insertion of the disc 12 into the chamber 32.

Inside the cap 30 is a guide plate 90 projecting from the end wall 68 along the top of the slot 82. The guide plate 90 is coplanar with the top ribs 52,56 of the tracks 46,48. Furthermore, the guide plate 90 projects beyond the top wall 64 (e.g., see FIG. 2). That portion of the plate 90 projecting beyond the wall 64 is sized to span the space between the upper ribs 52 and 56. The guide plate 90 consequently facilitates movement of the disc 12 into the tracks 46,48. For example, the user may insert the disc 12 into the slot 82 and press the top face 16 (i.e., the face that traditionally does not have information stored thereon and therefore does not have the problems associated with scratching that the bottom face 18 does) against the guide plate 90 as the disc 12 is assuredly slid into the tracks 46,48. If desired, the cap 20 may also be provided with a pair of ribs 92 (only the rib projecting from the wall 60 being shown in the drawing figures) defined along the inside of the respective side walls 60 and 62. The ribs 92 essentially form an extension of the lower ribs 50 and 54 of the tracks 46 and 48, whereby the disc 12 is maintained off the bottom wall 66 of the cap 30 and further guided between the slot 82 and the tracks 46,48. If desired, the top face of the lip 80 and the underside of the guide plate 90 may be covered with felt or some other soft non-scratching material for reducing the risk of disc scratches.

The cap 30 is preferably formed of the same material as the jacket 28, although dissimilar materials may be used. With particular respect to the preferred embodiment, the jacket 28 and cap 30 are formed of the same rigid plastic material, which is preferably transparent, and are glued, welded or otherwise attached to one another. It is also noted that the outer face of the end wall 68 above the access slot 82 defines a solid area that is particularly well suited for supporting a disc label (not shown) thereon. The outsides of the top and bottom walls 38 and 40, as well as the end wall 42, are likewise adapted to support labels (not shown) or some other form of indicia thereon.

It will be appreciated that the construction of the cap 30 is not limited to that shown. If desired, the cap may have different shapes and sizes than that shown. Furthermore, the chamber access slot could alternatively be defined in the end wall 42 of the jacket 28, with the alternative cap comprising simply a solid wall for closing off the jacket. In such an alternative embodiment, the button opening, clearance recess, pivot bar, and other preferred components of the cap would also preferably be provided on the jacket.

The case 10 further includes a disc release 94 that is actuated to cause ejection of the disc 12 from the chamber 32. The illustrated release 94 generally includes a lever 96 and a spring arm 98 projecting from one end of the lever 96 (e.g., see FIG. 1). The lever 96 preferably includes a first portion 96*a* and a relatively longer second portion 96*b* extending between the first portion 96*a* and the spring arm 98. The lever portions 96*a* and 96*b* are preferably angled relative to one another. A sleeve 100 that is open at the bottom thereof depends from the lever 96 generally at the juncture of the lever portions 96*a* and 96*b*. The sleeve 100 is configured to be snap fit onto the pivot bar 78 in a manner that permits the lever 96 to swing relative to the cap 30. The lever 96 further includes a push button 101 comprising a projection extending upwardly from the lever portion 96*a*. The button 101 is configured to be received in the button opening 70 defined in the top wall 64 of the cap 30. As perhaps best shown in FIG. 2, the button 101 has a semicircular shape and size corresponding to the opening 70, although the button 101 and opening 70 may alternatively have various other matching dimensions or may alternatively have different shapes and sizes.

Figure 8:
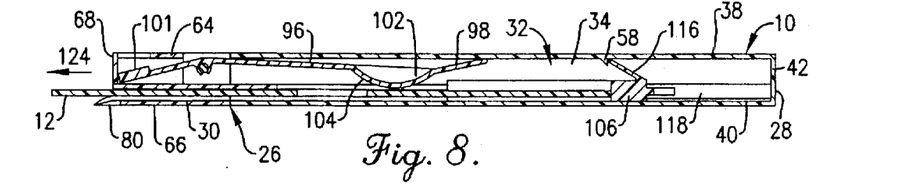
FIG. 8 is a cross-sectional view similar to FIG. 7, but illustrating the release in its actuated condition and the disc being ejected out of the housing by the ejector.

In any case, the button 101 provides a means by which the user may manually effect swinging of the lever 96. Particularly, when the button 101 is pushed (as shown in FIG. 8), the lever 96 is swung in a generally counterclockwise direction about the pivot bar 78. The clearance recess 72 in the top wall 64 of the case 30 accommodates for slight movement of the illustrated lever 96 into the area that would otherwise be occupied by the top wall 64. It is noted that the release 94 need not be manually actuatable, but rather the case may alternatively be configured for use with an automatic or machine operated release.

The illustrated spring arm 98 arm is angled relative to the long lever portion 96*b*. Although the arm 98 is generally rigid with respect to normal operating conditions, the junction of the long lever portion 96*b* and arm 98 permits resilient flexing of the arm 98. The spring arm 98 is configured to engage the underside of the top wall 38 of the jacket 28 (e.g., see FIGS. 7 and 8) in such a manner that the arm 98 normally presses yieldably against the bottom wall 40 (see particularly FIGS. 3 and 7). Moreover, when the button 101 (see particularly FIG. 8) is pushed or when a disc 12 is moving into and out of the chamber 32 (see particularly FIGS. 5 and 8), the illustrated arm 98 is flexed and thereby provides a yieldable return bias for urging the lever 96 in the clockwise direction about the pivot bar 78.

Figure 7:
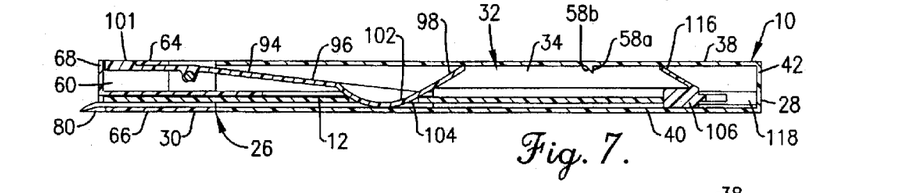
FIG. 7 is a cross-sectional view taken along line 7—7 of FIG. 6.

The case 10 further includes a disc catch 102 configured to be removably received in the central mounting hole 24 of the disc 12 (e.g., see FIG. 7). In the preferred embodiment, the catch 102 is connected to the lever portion 96*b* and, most preferably, is integrally formed with the lever 96. The preferred catch 102 is consequently shiftable, with shifting of the catch 102 corresponding with swinging of the lever 96. It may be said that the catch 102 is shiftable between a lower retaining position (e.g., see FIGS. 3 and 7) and a raised release position (e.g. see FIGS. 5 and 8). In the retaining position, the catch 102 engages the bottom wall 40 of the jacket 28 and is positioned to be received within the mounting hole 24 of the disc 12 (see FIG. 7). The catch 102 of the illustrated embodiment also serves to limit clockwise swinging of the lever 96 as result of the interengagement between the catch 102 and the bottom wall 40 (e.g., see FIGS. 3 and 7). On the other hand, in the release position, the catch 102 is shifted sufficiently away from the bottom wall 40 against the bias of the spring arm 98 to be removed from the mounting hole 24 (e.g., see FIG. 8). It is also in this position that the catch permits the disc 12 to move within the chamber 32.

The illustrated catch 102 is hemispherical in shape and presents an outer or lower disc engagement face 104. As the disc 12 is inserted into the chamber 32, the catch 102 rests in the retaining position. Moreover, the portion of the engagement face 104 aligned with the path of the disc 12 (i.e., the tracks 46 and 48) is obliquely oriented relative thereto (e.g., see FIG. 3). The engagement face 104 consequently provides a camming action, whereby the disc 12 engages the face 104, as the former is inserted into the chamber 32, and causes the catch 102 to shift away from the retaining position against the bias of the spring arm 98. That is, the catch 102 does not restrict movement of the disc 12 into the chamber 32 and is automatically shifted out of the way so that the disc 12 can be inserted virtually effortlessly. If for any reason the catch 102 has been shifted to the release position, the face 104 is positioned above the disc 12 and consequently does not restrict movement of the disc 12. In any case, once the disc 12 has been sufficiently inserted into the chamber 32 to position the mounting hole 42 in general alignment with the catch 102, the spring arm 98 will urge the lever 96 in the clockwise direction and thereby the catch 102 into the hole 24. It will be appreciated that the hemispherical shape of the catch 102 allows for some misalignment between the catch 102 and the mounting hole 24. Furthermore, the catch 102 engages the interior edge 22 of the disc 12 and thereby restricts relative edgewise movement of the disc 12.

The release 94 and catch 102 are preferably integrally formed from any suitable material (e.g., plastic, spring steel, etc.). It is particularly noted that if the case 10 is intended for use with a double-sided disc, the catch is coated or formed of a relatively soft material (e.g., an elastomeric material) to avoid scratching the adjacent face of the disc.

The present invention contemplates various other release and catch arrangements. For example, the catch 102 may alternatively be formed of a different material than the release 94 so that the components are not integrally formed but simply attached to one another after they have each been separately formed. Moreover, the catch 102 and release 94 need not be connected or even operably coupled. As will subsequently be described, the primary function of the release is to prevent the disc 12 from being ejected from the case 10 until the release is actuated. Thus, it is possible to provide an alternative disc catch that does not require to be shifted into and out of the mounting hole 24. Such an alternative catch might comprise a deformable rubber nipple (not shown) fixed to the housing 26 and disposed within the disc path, such that the nipple deforms when the disc is inserted into the housing and when a sufficient ejection bias is exerted against the disc.

It is also noted that the illustrated release 94 provides a visually perceptible signal to the user when the disc 12 has been "locked" into place by the catch 102 (i.e., when the catch 102 has been inserted into the mounting hole 24 by the bias of the spring arm 98). The signal generally comprises the push button 101. Particularly, the push button 101 shifts out of the opening 70 as the disc is inserted into the chamber 32 and causes the catch 102 to shift to the release position (see FIG. 5). However, once the disc 12 has been sufficiently inserted so that the spring arm 98 can return the catch 102 to the retaining position, the catch is inserted into the mounting hole 24 and the push button 101 is simultaneously returned into the opening 70 (see FIG. 7). Thus, when the button 101 snaps back into the opening 70, the user is assured that the disc 12 has been locked into place.

The case 10 further includes an ejector 106 that provides a sufficient ejection bias for causing the disc 12 to be ejected from the case 10 when the release 94 is actuated. The ejector 106 is preferably designed to engage the disc 12 and exert the ejection bias against the disc 12 while the disc 12 is held by the catch 102. Thus, as soon as the release 94 is actuated, the catch 102 is shifted out of the mounting hole 24, the disc 12 is consequently permitted to shift edgewise relative thereto, and the ejector 106 exerts the ejection bias against the disc 12 so that it is ejected from the chamber 32. It is possible, however, to configure the ejector 106 so as to avoid direct contact with the disc 12. Furthermore, the ejector 106 may alternatively be configured so that the ejection bias is not exerted against the disc 12 while it is held by the catch 102. For example, such an alternative ejector could be arranged with a shiftable catch (not shown) that is controlled by the release and serves to releasably hold the ejector in a flexed condition away from the disc 12.

With particular respect to the illustrated embodiment, the ejector 106 includes a shuttle 108 having a disc recess 110 defined therein. The recess 110 has a radius of curvature corresponding with the outer edge 14 of the disc 12 so that the shuttle 108 can wrap matingly around a section of the edge 14 (see FIG. 6). A pair of guide bars 112 and 114 projecting from opposite sides of the shuttle 108 are configured for sliding reception in respective ones of the tracks 46 and 48. The shuttle 108 consequently slides with the disc 12 along the tracks 46 and 48. However, movement of the shuttle 108 toward the cap 30 is limited by abutting engagement between the stop element 58 and an upwardly projecting flange 116 provided on the shuttle 108 (e.g., see FIGS. 3, 5 and 8). The flange 116 has sufficient flexibility to pass over the cam face 58b during assembly of the case 10 (i.e., as the ejector 106 is slid along the tracks 46 and 48 toward the end wall 42), yet the flange 116 has sufficient rigidity to prevent movement of the shuttle 108 toward the case 30 when the flange 116 engages the abutment face 58a. A pair of spring arms 118 and 120 projecting from the end of the shuttle 108 opposite from the recess 110 provide the ejection bias for ejecting the disc 12 out of the case 10. The arms 118 and 120 are configured to have an elasticity that permits repeated flexing but provides a memory which causes the shuttle 108 to exert a sufficient ejection bias against the disc 12 to cause the disc 12 to slide along the tracks 46,48 and out of the chamber 32. In the illustrated embodiment, the arms 118,120 are flexed between the condition shown in FIG. 2 and the condition shown in FIG. 6.

The ejector 106 is preferably integrally formed of any suitable material (e.g., plastic, spring steel, etc.). However, it is entirely within the ambit of the present invention to use various other ejector configurations. For example, the arms 18 and 120 may alternatively be formed of a sufficiently elastically flexible material (e.g., spring steel), while the remaining components of the ejector 106 are integrally formed of a relatively inelastic material. The ejection bias may alternatively be provided by a single continuous element (e.g., a C-shaped elastically flexible bar) rather than two spaced apart arms.

The use of the illustrated case 10 should be apparent from the foregoing description. Thus, it shall be sufficient to explain that the disc 12 is inserted edgewise into the case 10 as represented by the arrow 122 in FIG. 5. In so doing, the disc 12 passes through the slot 82 and is guided onto the tracks 46,48 by the guide plate 90 and ribs 92. As the disc 12 moves toward the end wall 42, the disc 12 engages the catch 102 and causes the catch 102 to shift upwardly against the bias of the spring arm 98. Such movement of the disc 12 may be effected by pushing against the outer edge 14 with a finger. Because the ejector 106 is biased against the stop element 58 (e.g., see FIGS. 2 and 3), the disc 12 will eventually contact the shuttle 108 and have to be pushed inwardly against the ejection bias. Once the mounting hole 24 of the disc 12 is generally aligned with the catch 102 (e.g., see FIG. 7), the catch 102 is automatically snapped downwardly into the hole 24 by the spring arm 98 and the disc is thereby held in place (i.e., prevented from shifting edgewise within the chamber 32). It is noted that the finger cutout 88 in the lip 80 ensures that the user can push the disc 12 completely into the chamber 32.

It will further be appreciated that the disc 12 is tightly held in place so that even slight vibration of the disc 12 relative to the case 10 is virtually eliminated. Particularly, the bias of the spring arm 98 causes the catch 102 to forcibly engage the interior edge 22 of the disc 12 so that the risk of relative disc movement is essentially prevented. In addition, the ejection bias exerted against the disc 12 by the ejector 106, as the disc 12 is held by the catch 102, further restricts relative disc movement.

When the disc 12 is to be ejected from the case 10, the user simply pushes the button 101 to actuate the release 94. Particularly, pushing of the button 101 causes the lever 96 to swing about the pivot bar 78 and the catch 102 to correspondingly shift out of the mounting hole 24 (e.g., see FIG. 8). The ejection bias provided by the ejector 106 is exerted against the edge 14 of the disc 12, and the disc 12 is shifted out of the case 10 in the direction of arrow 124. The shuttle 108 moves with the disc 12 until the flange 116 engages the stop element 58, whereupon further shuttle movement is prevented but sliding of the disc 12 along the tracks 46,48 may continue. Preferably, the ejection bias does not cause the disc 12 to be propelled completely out of the case 10, but rather the disc 12 is only partly ejected preferably to the position shown in FIGS. 4 and 5. Such positioning permits the user to conveniently insert a finger into the mounting hole 24 and slide the disc 10 completely out of the chamber 32.

A slightly modified embodiment of the present invention is shown in FIG. 9, wherein the disc case 200 is provided with an alternative disc catch 202. It is first noted that the case 200 is otherwise similar in construction and function to that shown in FIGS. 1–8. Turning to the alternative catch 202, a ridge 204 is defined along the backside of the catch 202 (i.e., the portion of the catch opposite from the access slot) to flatly engage the interior edge 206 of the disc 208. It is believed that such an arrangement further lessens the likelihood of disc movement relative to the case 200.

The preferred forms of the invention described above are to be used as illustration only, and should not be utilized in a limiting sense in interpret the scope of the present invention. Obvious modifications to the exemplary embodiments, as hereinset forth, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

What is claimed is:

1. A disc carrying case for storing a disc having an outer edge and a mounting hole located interiorly from the edge, said case comprising:

a housing presenting a disc chamber configured to receive a disc therein, with a chamber access opening being defined in the housing such that the disc moves through the opening as the disc is transferred to and from the chamber;

a disc catch shiftably supported within the chamber and operable to shift into and out of the mounting hole, said catch preventing edgewise movement of the disc relative to the housing when the catch is inserted into the mounting hole;

a disc ejector located at least partly within the chamber and configured to provide a yieldable ejection bias against the disc when the catch is inserted into the mounting hole, with the ejection bias being sufficient to urge the disc out of the opening when the catch is removed from the mounting hole of the disc; and an actuatable release operably coupled to the catch to cause, when actuated, shifting of the catch in a direction corresponding to removal of the catch from the mounting hole, said release including a depressible button that actuates the release when depressed, said button being adjacent the chamber access opening.

2. A disc carrying case as claimed in claim 1, said housing including a pair of opposed tracks that are generally aligned with the opening, each of said tracks being configured to slidably receive at least the outer edge of the disc therein so that the disc is at least in part supported within the housing by the tracks.

3. A disc carrying case as claimed in claim 1, said release including a swingable lever coupled to the catch so that swinging of the lever corresponds with shifting of the catch.

4. A disc carrying case as claimed in claim 3, said catch being mounted on the lever.

5. A disc carrying case for storing a disc having an outer edge and a mounting hole located interiorly from the edge, said case comprising:

a housing presenting a disc chamber configured to receive a disc therein, with a chamber access opening being defined in the housing such that the disc moves through the opening as the disc is transferred to and from the chamber;

a disc catch shiftably supported within the chamber and operable to shift into and out of the mounting hole, said catch preventing edgewise movement of the disc relative to the housing when the catch is inserted into the mounting hole;

a disc ejector located at least partly within the chamber and configured to provide a yieldable ejection bias against the disc when the catch is inserted into the mounting hole, with the ejection bias being sufficient to urge the disc out of the opening when the catch is removed from the mounting hole of the disc; and an actuatable release operably coupled to the catch to cause, when actuated, shifting of the catch in a direction corresponding to removal of the catch from the mounting hole said housing including a hollow boxlike jacket having an open end, said housing further including a cap fixed to the jacket over the open end, with the opening being defined in the cap.

6. A disc carrying case for storing a disc having an outer edge and a mounting hole located interiorly from the edge, said case comprising:

a housing presenting a disc chamber configured to receive a disc therein, with a chamber access opening being defined in the housing such that the disc moves through the opening as the disc is transferred to and from the chamber;

a disc catch shiftably supported within the chamber and operable to shift into and out of the mounting hole, said catch preventing edgewise movement of the disc relative to the housing when the catch is inserted into the mounting hole;

a disc ejector located at least partly within the chamber and configured to provide a yieldable ejection bias against the disc when the catch is inserted into the mounting hole, with the ejection bias being sufficient to urge the disc out of the opening when the catch is removed from the mounting hole of the disc; and an actuatable release operably coupled to the catch to cause, when actuated, shifting of the catch in a direction corresponding to removal of the catch from the mounting hole, said housing including a pair of opposed tracks that are generally aligned with the opening, each of said tracks being configured to slidably receive at least the outer edge of the disc therein so that the disc is at least in part supported within the housing by the tracks, said tracks being spaced from the opening, said housing including a guide plate extending between the opening and the tracks to facilitate movement of the disc between the opening and tracks.

7. A disc carrying case for storing a disc having an outer edge and a mounting hole located interiorly from the edge, said case comprising:

a housing presenting a disc chamber configured to receive a disc therein, with a chamber access opening being defined in the housing such that the disc moves through the opening as the disc is transferred to and from the chamber;

a disc catch shiftably supported within the chamber and operable to shift into and out of the mounting hole, said catch preventing edgewise movement of the disc relative to the housing when the catch is inserted into the mounting hole;

a disc ejector located at least partly within the chamber and configured to provide a yieldable ejection bias against the disc when the catch is inserted into the mounting hole, with the ejection bias being sufficient to urge the disc out of the opening when the catch is removed from the mounting hole of the disc; and an actuatable release operably coupled to the catch to cause, when actuated, shifting of the catch in a direction corresponding to removal of the catch from the mounting hole, said release including a swingable lever coupled to the catch so that swinging of the lever corresponds with shifting of the catch, said catch being mounted on the lever, said release including a depressible push button provided on the lever, said push button being manually pushed to actuate the release.

8. A disc carrying case for storing a disc having an outer edge and a mounting hole located interiorly from the edge, said case comprising:

a housing presenting a disc chamber configured to receive a disc therein, with a chamber access opening being defined in the housing such that the disc moves through the opening as the disc is transferred to and from the chamber;

a disc catch shiftably supported within the chamber and operable to shift into and out of the mounting hole, said catch preventing edgewise movement of the disc relative to the housing when the catch is inserted into the mounting hole;

a disc ejector located at least partly within the chamber and configured to provide a yieldable ejection bias against the disc when the catch is inserted into the mounting hole, with the ejection bias being sufficient to urge the disc out of the opening when the catch is removed from the mounting hole of the disc; and an actuatable release operably coupled to the catch to cause, when actuated, shifting of the catch in a direction corresponding to removal of the catch from the mounting hole, said release including a swingable lever coupled to the catch so that swinging of the lever corresponds with shifting of the catch, said catch being mounted on the lever, said release including a spring mechanism configured to yieldably bias the catch to shift in an opposite direction corresponding to insertion of the catch into the mounting hole.

9. A disc carrying case as claimed in claim 8, said housing including a pair of opposed tracks that are generally aligned with the opening, each of said tracks being configured to slidably receive at least the outer edge of the disc therein so that the disc is at least in part supported within the housing by the tracks, said catch including a disc engagement face that is at least partly oblique in orientation with respect to the tracks, whereby the disc shifts the catch in the first-mentioned direction against the bias of the spring mechanism when the disc is slid along the tracks into the chamber.

10. A disc carrying case for carrying a disc having an outer edge and a mounting hole located interiorly from the edge, said case comprising:

a housing presenting a disc chamber configured to receive a disc therein, with an elongated chamber access slot being defined in the housing such that the disc moves edgewise through the slot as the disc is transferred to and from the chamber;

a disc catch located within the chamber and configured to be removably inserted within the mounting hole to prevent edgewise movement of the disc relative to the housing when the catch is inserted into the mounting hole;

a disc ejector located at least partly within the disc chamber and configured to engage the disc and provide a yieldable ejection bias against the disc that is sufficient to eject the disc from the chamber; and an actuatable release that prevents the ejector from causing the disc to be ejected from the chamber until the release has been actuated, said relase including a depressible button that actuates the release when depressed, said button being located adjacent the chamber access slot.

11. A disc carrying case as claimed in claim 10, said housing including a pair of opposed tracks that are generally aligned with the slot, each of said tracks being configured to slidably receive at least the outer edge of the disc therein so that the disc is at least in part supported within the housing by the tracks.

12. A disc carrying case as claimed in claim 10, said catch being shiftably supported within the chamber and operable to shift into and out of the mounting hole, said release being operably coupled to the catch to cause, when actuated, shifting of the catch in a direction corresponding to removal of the catch from the mounting hole.

13. A disc carrying case as claimed in claim 12, said ejector being configured to exert the ejection bias against the disc when the catch is received within the mounting hole of the disc, such that shifting of the catch caused by actuation of the release permits the ejector to eject the disc from the case.

14. A disc carrying case as claimed in claim 12, said release including a swingable lever coupled to the catch so that swinging of the lever corresponds with shifting of the catch.

15. A disc carrying case as claimed in claim 14, said catch being mounted on the lever.

16. A disc carrying case for carrying a disc having an outer edge and a mounting hole located interiorly from the edge, said case comprising:

a housing presenting a disc chamber configured to receive a disc therein, with an elongated chamber access slot being defined in the housing such that the disc moves edgewise through the slot as the disc is transferred to and from the chamber;

a disc catch located within the chamber and configured to be removably inserted within the mounting hole to prevent edgewise movement of the disc relative to the housing when the catch is inserted into the mounting hole;

a disc ejector located at least partly within the disc chamber and configured to engage the disc and provide a yieldable ejection bias against the disc that is sufficient to eject the disc from the chamber; and an actuatable release that prevents the ejector from causing the disc to be ejected from the chamber until the release has been actuated, said housing including a hollow boxlike jacket having an open end, said housing further including a cap fixed to the jacket over the open end, with the slot being defined in the cap.

17. A disc carrying case for carrying a disc having an outer edge and a mounting hole located interiorly from the edge, said case comprising:

a housing presenting a disc chamber configured to receive a disc therein, with an elongated chamber access slot being defined in the housing such that the disc moves edgewise through the slot as the disc is transferred to and from the chamber;

a disc catch located within the chamber and configured to be removably inserted within the mounting hole to prevent edgewise movement of the disc relative to the housing when the catch is inserted into the mounting hole;

a disc ejector located at least partly within the disc chamber and configured to engage the disc and provide a yieldable ejection bias against the disc that is sufficient to eject the disc from the chamber; and an actuatable release that prevents the ejector from causing the disc to be ejected from the chamber until the release has been actuated, said housing including a pair of opposed tracks that are generally aligned with the slot, each of said tracks being configured to slidably receive at least the outer edge of the disc therein so that the disc is at least in part supported within the housing by the tracks, said tracks being spaced from the slot, said housing including a guide plate extending between the slot and the tracks to facilitate movement of the disc between the slot and tracks.

18. A disc carrying case for carrying a disc having an outer edge and a mounting hole located interiorly from the edge, said case comprising:

a housing presenting a disc chamber configured to receive a disc therein, with an elongated chamber access slot being defined in the housing such that the disc moves edgewise through the slot as the disc is transferred to and from the chamber;

a disc catch located within the chamber and configured to be removably inserted within the mounting hole to prevent edgewise movement of the disc relative to the housing when the catch is inserted into the mounting hole;

a disc ejector located at least partly within the disc chamber and configured to engage the disc and provide a yieldable ejection bias against the disc that is sufficient to eject the disc from the chamber; and an actuatable release that prevents the ejector from causing the disc to be ejected from the chamber until the release has been actuated, said catch being shiftably supported within the chamber and operable to shift into and out of the mounting hole, said release being operably coupled to the catch to cause, when actuated, shifting of the catch in a direction corresponding to removal of the catch from the mounting hole, said release including a swingable lever coupled to the catch so that swinging of the lever corresponds with shifting of the catch, said catch being mounted on the lever, said release including a depressible push button provided on the lever, said push button being manually pushed to actuate the release.

19. A disc carrying case for carrying a disc having an outer edge and a mounting hole located interiorly from the edge, said case comprising:

a housing presenting a disc chamber configured to receive a disc therein, with an elongated chamber access slot being defined in the housing such that the disc moves edgewise through the slot as the disc is transferred to and from the chamber;

a disc catch located within the chamber and configured to be removably inserted within the mounting hole to prevent edgewise movement of the disc relative to the housing when the catch is inserted into the mounting hole;

a disc ejector located at least partly within the disc chamber and configured to engage the disc and provide a yieldable ejection bias against the disc that is sufficient to eject the disc from the chamber; and an actuatable release that prevents the ejector from causing the disc to be ejected from the chamber until the release has been actuated, said catch being shiftably supported within the chamber and operable to shift into and out of the mounting hole, said release being operably coupled to the catch to cause, when actuated, shifting of the catch in a direction corresponding to removal of the catch from the mounting hole, said release including a swingable lever coupled to the catch so that swinging of the lever corresponds with shifting of the catch, said catch being mounted on the lever, said release including a spring mechanism configured to yieldably bias the catch to shift in an opposite direction corresponding to insertion of the catch into the mounting hole.

20. A disc carrying case as claimed in claim 19, said housing including a pair of opposed tracks that are generally aligned with the slot, each of said tracks being configured to slidably receive at least the outer edge of the disc therein so that the disc is at least in part supported within the housing by the tracks, said catch including a disc engagement face that is at least partly oblique in orientation with respect to the tracks, whereby the disc shifts the catch in the first-mentioned direction against the bias of the spring mechanism when the disc is slid along the tracks into the chamber.

21. A disc carrying case for storing a disc having an outer edge and a mounting hole located interiorly from the edge, said case comprising:

a housing presenting a disc chamber configured to receive a disc therein, with a chamber access opening being defined in the housing such that the disc moves through the opening as the disc is transferred to and from the chamber;

a disc catch shiftably supported within the chamber and operable to shift into and out of the mounting hole; and an actuatable release operably coupled to the catch to cause, when actuated, shifting of the catch in a direction corresponding to removal of the catch from the mounting hole, said disc catch being at least substantially restrained from translational movement relative to the housing in directions corresponding to the edgewise movement of the disc, said catch presenting an engagement face that is at least partly oblique in orientation with respect to the outer edge of the disc.

22. A disc carrying case for storing a disc having an outer edge and a mounting hole located interiorly from the edge, said case comprising:

a housing presenting a disc chamber configured to receive a disc therein, with a chamber access opening being defined in the housing such that the disc moves through the opening as the disc is transferred to and from the chamber;

a disc catch shiftably supported within the chamber and operable to shift into and out of the mounting hole; and an actuatable release operably coupled to the catch to cause, when actuated, shifting of the catch in a direction corresponding to removal of the catch from the mounting hole, said disc catch being at least substantially restrained from translational movement relative to the housing in directions corresponding to the edgewise movement of the disc, said release being pivotally coupled to the housing and having first and second ends, said first end being coupled to the catch, said second end having a depressible button that actuates the release when depressed.

23. A disc carrying case for storing a disc having an outer edge and a mounting hole located interiorly from the edge, said case comprising:

a housing presenting a disc chamber configured to receive a disc therein, with a chamber access opening being defined in the housing such that the disc moves through the opening as the disc is transferred to and from the chamber, said housing presenting a disc path along which the disc moves within the chamber;

a disc catch shiftably supported within the chamber and operable to shift into and out of the mounting hole;

a disc ejector located at least partly within a chamber, said ejector exerting a yieldable ejection bias against the disc when the catch is inserted into the mounting hole, with the ejection bias being sufficient to urge the disc out of the opening when the catch is removed from the mounting hole of the disc; and an actuatable release operably coupled to the catch to cause, when actuated, shifting of the catch in a direction corresponding to removal of the catch from the mounting hole, said catch being at least substantially restrained from movement along the disc path relative to the housing.

24. A disc carrying case as claimed in claim 23, said disc ejector comprising at least one flexible arm that at least partly generates the ejection bias when flexed.

25. A disc carrying case as claimed in claim 23, said catch operable to at least substantially prevent edgewise movement of the disc relative to the housing when the catch is inserted into the mounting hole.

26. A disc carrying case for storing a disc having an outer edge and a mounting hole located interiorly from the edge, said case comprising:

a housing presenting a disc chamber configured to receive a disc therein, with a chamber access opening being defined in the housing such that the disc moves through the opening as the disc is transferred to and from the chamber;

a disc catch shiftably supported within the chamber and operable to shift into and out of the mounting hole;

a disc ejector located at least partly within a chamber, said ejector exerting a yieldable ejection bias against the disc when the catch is inserted into the mounting hole, with the ejection bias being sufficient to urge the disc out of the opening when the catch is removed from the mounting hole of the disc; and an actuatable release operably coupled to the catch to cause, when actuated, shifting of the catch in a direction corresponding to removal of the catch from the mounting hole, said catch being at least substantially restrained from translational movement relative to the housing in directions corresponding to the edgewise movement of the disc, said catch presenting an engagement face that is at least partly oblique in orientation with respect to the outer edge of the disc.

27. A disc carrying case for storing a disc having an outer edge and a mounting hole located interiorly from the edge, said case comprising:

a housing presenting a disc chamber configured to receive a disc therein, with a chamber access opening being defined in the housing such that the disc moves through the opening as the disc is transferred to and from the chamber;

a disc catch shiftably supported within the chamber and operable to shift into and out of the mounting hole;

a disc ejector located at least partly within a chamber, said ejector exerting a yieldable ejection bias against the disc when the catch is inserted into the mounting hole, with the ejection bias being sufficient to urge the disc out of the opening when the catch is removed from the mounting hole of the disc; and an actuatable release operably coupled to the catch to cause, when actuated, shifting of the catch in a direction corresponding to removal of the catch from the mounting hole, said catch being at least substantially restrained from translational movement relative to the housing in directions corresponding to the edgewise movement of the disc, said release being pivotally coupled to the housing and having first and second ends, said first end being coupled to the catch, said second end having a depressible button that actuates the release when depressed.

28. A disc carrying case as claimed in claim 27,
said button being located proximate the chamber access opening.

29. A disc carrying case for storing a disc having an outer edge and a mounting hole located interiorly from the edge, said case comprising:
a housing presenting a disc chamber configured to receive a disc therein, with a chamber access opening being defined in the housing such that the disc moves through the opening as the disc is transferred to and from the chamber;
a disc catch shiftably supported within the chamber and operable to shift into and out of the mounting hole;
a disc ejector located at least partly within a chamber,
said ejector exerting a yieldable ejection bias against the disc when the catch is inserted into the mounting hole, with the ejection bias being sufficient to urge the disc out of the opening when the catch is removed from the mounting hole of the disc; and
an actuatable release operably coupled to the catch to cause, when actuated, shifting of the catch in a direction corresponding to removal of the catch from the mounting hole,
said catch being at least substantially restrained from translational movement relative to the housing in directions corresponding to the edgewise movement of the disc,
said housing including a pair of opposed tracks,
said ejector including a pair of guide bars slidably received within the tracks.

30. A carrying case for storing a recorded media having an outer edge and at least one mounting hole located inwardly from the outer edge, said carrying case comprising:
a housing presenting a media chamber configured to receive a recorded media therein, with a chamber access opening being defined in the housing such that the media moves through the opening as the media is transferred to and from the chamber;
a media catch shiftably supported within the chamber and operable to shift into and out of the mounting hole,
said catch at least substantially preventing edgewise movement of the media relative to the housing when the catch is inserted into the mounting hole;
a media ejector located at least partly within the chamber and configured to provide a yieldable ejection bias against the media when the catch is inserted into the mounting hole, with the ejection bias being sufficient to urge the media out of the opening when the catch is removed from the mounting hole of the media; and
an actuatable release operably coupled to the catch to cause, when actuated, shifting of the catch in a direction corresponding to removal of the catch from the mounting hole,
said release including a depressible button that actuates the release when depressed,
said button being adjacent the chamber access opening.

31. A carrying case as claimed in claim 30,
said catch being at least substantially restrained from translational movement relative to the housing in directions corresponding to the edgewise movement of the media.

32. A carrying case for storing a recorded media having an outer edge and at least one mounting hole located inwardly from the outer edge, said carrying case comprising:
a housing presenting a media chamber configured to receive a recorded media therein, with a chamber access opening being defined in the housing such that the media moves through the opening as the media is transferred to and from the chamber;
a media catch shiftably supported within the chamber and operable to shift into and out of the mounting hole,
said catch at least substantially preventing edgewise movement of the media relative to the housing when the catch is inserted into the mounting hole;
a media ejector located at least partly within the chamber and configured to provide a yieldable ejection bias against the media when the catch is inserted into the mounting hole, with the ejection bias being sufficient to urge the media out of the opening when the catch is removed from the mounting hole of the media; and
an actuatable release operably coupled to the catch to cause, when actuated, shifting of the catch in a direction corresponding to removal of the catch from the mounting hole,
said catch presenting an engagement face that is at least partly oblique in orientation with respect to the outer edge of the media.

33. A carrying case for storing a recorded media having an outer edge and at least one mounting hole located inwardly from the outer edge, said carrying case comprising:
a housing presenting a media chamber configured to receive a recorded media therein, with a chamber access opening being defined in the housing such that the media moves through the opening as the media is transferred to and from the chamber;
a media catch shiftably supported within the chamber and operable to shift into and out of the mounting hole,
said catch at least substantially preventing edgewise movement of the media relative to the housing when the catch is inserted into the mounting hole;
a media ejector located at least partly within the chamber and configured to provide a yieldable ejection bias against the media when the catch is inserted into the mounting hole, with the ejection bias being sufficient to urge the media out of the opening when the catch is removed from the mounting hole of the media; and
an actuatable release operably coupled to the catch to cause, when actuated, shifting of the catch in a direction corresponding to removal of the catch from the mounting hole,
said release being pivotally coupled to the housing and having first and second ends,
said first end being coupled to the catch,
said button being on the second end of the lever.

34. A carrying case as claimed in claim 33,
said button being located proximate the chamber access opening.

35. A carrying case for storing a recorded media having an outer edge and at least one mounting hole located inwardly from the outer edge, said carrying case comprising:
a housing presenting a media chamber configured to receive a recorded media therein, with a chamber access opening being defined in the housing such that the media moves through the opening as the media is transferred to and from the chamber;
a media catch shiftably supported within the chamber and operable to shift into and out of the mounting hole,
said catch at least substantially preventing edgewise movement of the media relative to the housing when the catch is inserted into the mounting hole;

a media ejector located at least partly within the chamber and configured to provide a yieldable ejection bias against the media when the catch is inserted into the mounting hole, with the ejection bias being sufficient to urge the media out of the opening when the catch is removed from the mounting hole of the media; and an actuatable release operably coupled to the catch to cause, when actuated, shifting of the catch in a direction corresponding to removal of the catch from the mounting hole, said housing including a pair of opposed tracks, said ejector including a pair of guide bars slidably received within the tracks.

* * * * *